(12) United States Patent
McCarthy et al.

(10) Patent No.: US 11,317,477 B2
(45) Date of Patent: Apr. 26, 2022

(54) HEATING DEVICE

(71) Applicant: BorgWarner Ludwigsburg GmbH, Ludwigsburg (DE)

(72) Inventors: Cian McCarthy, Dingle (IE); Thomas O'Carroll, Causeway (IE); Katherine O'Sullivan, Co. Kerry (IE); Stephen Sweeney, Tralee (IE); Ivan Morris, Co. Kerry (IE); Kevin Dukes, Co. Kerry (IE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 344 days.

(21) Appl. No.: 16/354,946

(22) Filed: Mar. 15, 2019

(65) Prior Publication Data

US 2019/0289676 A1 Sep. 19, 2019

(30) Foreign Application Priority Data

Mar. 19, 2018 (DE) ..................... 10 2018 106 296.6

(51) Int. Cl.
| | | |
|---|---|---|
| H05B 3/50 | (2006.01) | |
| H05B 3/14 | (2006.01) | |
| F24H 9/1863 | (2022.01) | |
| H05B 1/02 | (2006.01) | |
| F24H 3/04 | (2022.01) | |
| B60H 1/22 | (2006.01) | |

(52) U.S. Cl.
CPC ............ *H05B 3/50* (2013.01); *F24H 9/1872* (2013.01); *H05B 1/0236* (2013.01); *H05B 3/141* (2013.01); *B60H 1/2225* (2013.01); *F24H 3/0435* (2013.01); *H05B 2203/019* (2013.01); *H05B 2203/02* (2013.01); *H05B 2203/023* (2013.01)

(58) Field of Classification Search
CPC . H05B 3/50; H05B 3/141; H05B 3/24; H05B 3/02; H05B 3/22; H05B 3/42; H05B 1/0236; H05B 2203/019; H05B 2203/02; H05B 2203/023; F24H 9/1872; F24H 3/0435; F24H 3/0405; F24H 3/0429; B60H 1/2225
See application file for complete search history.

(56) References Cited

U.S. PATENT DOCUMENTS

| | | |
|---|---|---|
| 2004/0169027 A1 | 9/2004 | Bohlender et al. |
| 2014/0034634 A1 | 2/2014 | Waechter et al. |
| 2016/0214463 A1* | 7/2016 | Gries .................... F24H 3/0435 |

(Continued)

FOREIGN PATENT DOCUMENTS

| | | |
|---|---|---|
| CN | 1525795 A | 9/2004 |
| CN | 103228998 A | 7/2013 |
| CN | 106162955 A | 11/2016 |

(Continued)

*Primary Examiner* — Shawntina T Fuqua
(74) *Attorney, Agent, or Firm* — Bose McKinney & Evans LLP

(57) ABSTRACT

Disclosed is a heating device comprising a plate-shaped ceramic PTC resistor having a thickness, a front side, a back side and narrow sides, wherein the distance from the front side to the back side equals the thickness, and a first contact element and a second contact element, which are electrically contacting the PTC resistor. The PTC resistor is electrically contacted by the contact elements on opposite narrow sides.

12 Claims, 2 Drawing Sheets

(56) References Cited

U.S. PATENT DOCUMENTS

2016/0332507 A1 11/2016 Sweeney et al.
2019/0084374 A1* 3/2019 Min ........................ H05B 1/02

FOREIGN PATENT DOCUMENTS

| CN | 107535016 A | 1/2018 |
| DE | 39 42 266 C1 | 3/1991 |
| DE | 38 850 87 D1 | 11/1993 |
| DE | 10 2012 107 113 A1 | 2/2014 |
| DE | 10 2015 107 316 A1 | 11/2016 |
| EP | 0 333 906 A1 | 9/1989 |

* cited by examiner

HEATING DEVICE

RELATED APPLICATIONS

This application claims priority to DE 10 2018 106 296.6, filed Mar. 19, 2018, the entire disclosure of which is hereby incorporated herein by reference.

BACKGROUND

This disclosure is based on a heating device of the general type having plate-shaped PTC resistors, such as are generally known from DE 10 2015 107 316 A1, DE 10 2012 107 113 A1 or DE 39 42 266 C1, for example.

Heating devices for vehicles, e.g., for heating the interior of the passenger compartment, usually contain plate-shaped ceramic PTC resistors for generating heat because PTC resistors are inherently protected from overheating as they show a marked increase of electrical resistance at a critical temperature. The electrical resistance of PTC resistors at low temperatures is rather low causing significant inrush currents, especially if several PTC resistors connected in parallel are used.

Plate-shaped PTC resistors on the basis of barium titanate have been developed for heating devices in vehicles having an on-board power supply of 12 V or 24 V. When such PTC resistors are used in heating devices for vehicles having an on-board power supply of 48 V or even above 100 V, care must be taken to prevent currents from becoming too high.

Transforming a high on-board voltage to a lower voltage of 12 V or 24 V is rather expensive and not economical.

Currents can be reduced by connecting several resistors in series. DE 10 2015 107 316 A1 discloses a heating device wherein an NTC resistor is connected in series with PTC resistors. Although currents can be significantly reduced in this way, the in-series connection increases manufacturing costs significantly.

SUMMARY

This disclosure shows how a heating device for vehicles with an on-board power supply of 48 V, or even above 100 V can be provided economically with common PTC resistors.

In one embodiment, a plate-shaped PTC resistor has a front side, a back side and narrow sides connecting the front side and the back side. The distance between the front side and the back side is equal to the thickness of the plate-shaped PTC resistor. The distance between opposite narrow sides is the width or length of the plate-shaped PTC resistor. In prior art heating devices as disclosed, e.g., in DE 10 2015 107 316 A1, DE 10 2012 107 113 A1 or DE 39 42 266 A1, the PTC resistors are electrically contacted on their front and backside. In contrast, the PTC resistor(s) of a heating device according to this disclosure are electrically contacted at opposite narrow sides. Hence, the electrical resistance of the PTC resistor in a device according to this disclosure is significantly higher so that even at much higher voltages of 100 V or more currents stay well within an acceptable range.

A heating device according to this disclosure can contain several plate-shaped PTC resistors that are electrically contacted by contact elements on opposite narrow sides. Several PTC resistors can be connected in parallel and arranged between the same two contact elements. Thereby, a rod-shaped heating device can be provided economically.

An advantageous refinement of this disclosure comprises an electrically isolating frame that holds the ceramic PTC resistor(s) and the contact elements. The contact elements can be embedded in the frame, e.g., in a frame made of plastic by insert molding the contact elements.

Another advantageous refinement of this disclosure is that the contact elements press resiliently against the PTC resistor(s). For example, the contact elements may form springs that press against the PTC resistors. The contact elements may be provided as leaf springs, especially as bent leaf springs.

Spring forces can be used to clamp the PTC resistor(s) in the frame. For example, the electrical contact elements can be provided as strips of sheet metal. A rim section of such a strip can be bent off such that the contact element can resiliently press against the PTC resistors(s). The bent off rim section acts like a bent leaf spring.

Another advantageous refinement of this disclosure comprises a tube in which the ceramic PTC resistor or resistors and the contact elements are arranged. Such a tube may be made of metal and electrically isolated from the tube by layers of a ceramic material or some other isolator covering the front side and back side, respectively, of the PTC resistor(s).

Embodiments incorporating these teachings may, for example, be provided as an air heater comprising several rod-shaped heating devices arranged side by side and cooling fins that are arranged between neighboring heating devices.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
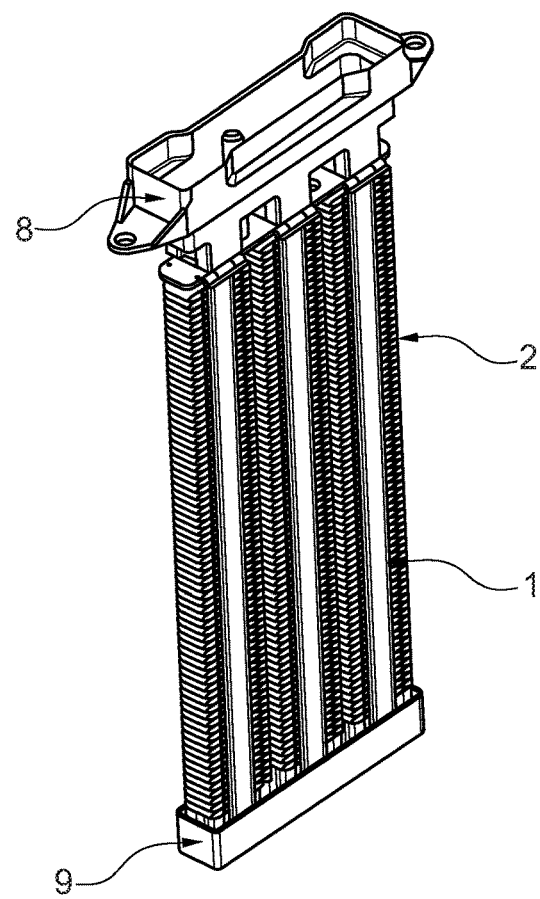
FIG. 1 shows an electrical heating device.

FIG. 1 shows a heating device for heating the interior of the passenger compartment of a vehicle. The heating device shown in FIG. 1 is an air heater comprising several heating rods 1 and cooling fins 2 connected to the heating rods 1. The heating rods 1 are arranged side by side and cooling fins 2 between them. The ends of the heating rods 1 are held by holders 8, 9.

Figure 2:
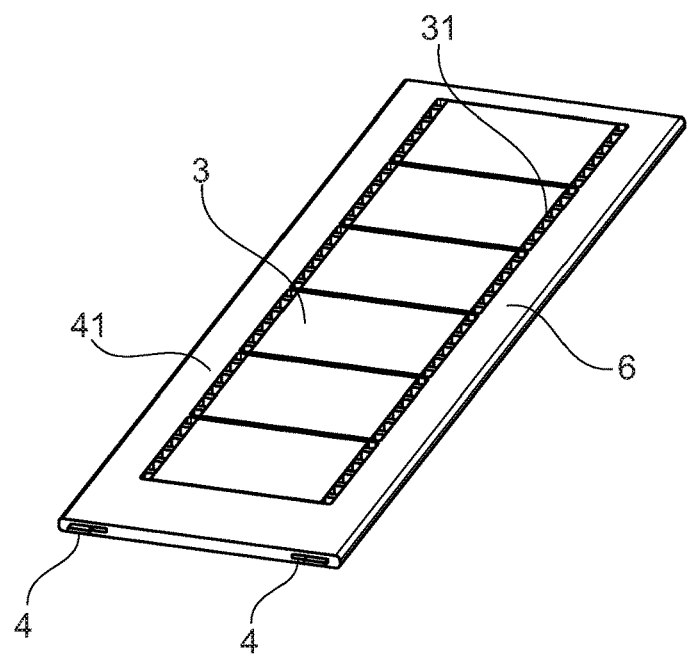
FIG. 2 shows a frame holding contact elements and several PTC resistors.
Figure 3:
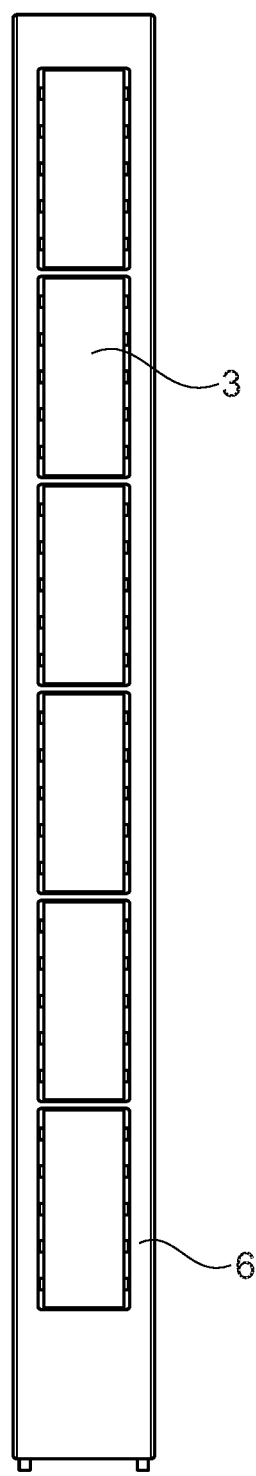
FIG. 3 shows another view of the arrangement of FIG. 2.
Figure 4:
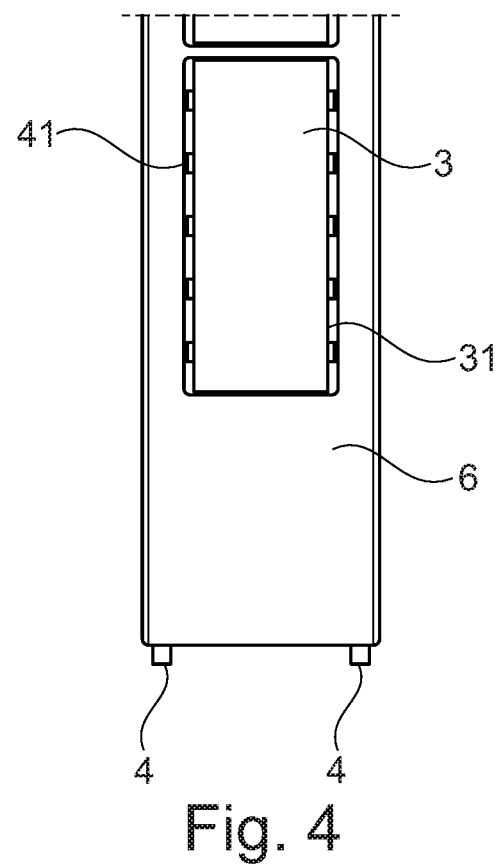
FIG. 4 shows a detail of FIG. 3.
Figure 5:
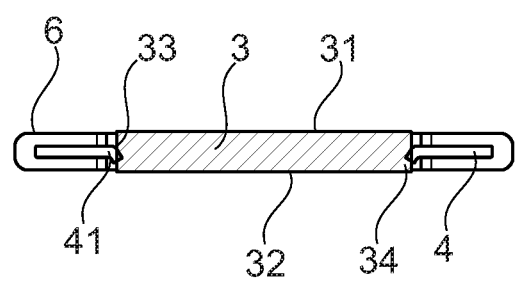
FIG. 5 shows a sectional view to FIG. 3.

The heating rods 1 may comprises tubes, e.g., flat tubes, in which plate-shaped PTC resistors made of a ceramic based on barium titanate are arranged. The tubes of the heating rods may be made of metal, e.g., an aluminum based alloy. FIGS. 2 and 3 show an illustrative example of an isolating frame 6 holding several plate-shaped PTC resistors 3 and electrical contact elements 4. FIG. 4 shows a detail of FIG. 3, namely an end of the frame 6 and the contact elements 4 together with one of the PTC resistors 3. FIG. 5 shows a cross section of the frame 6 with contact elements 4 and PTC resistor 3.

The plate-shaped PTC resistors 3 each have a front side 31, a back side 32 and narrow sides 33, 34. The distance between the front side 31 and the back side 32 is the thickness of the plate-shaped PTC resistor 3. The distance between opposite narrow sides 33, 34 is the width of the plate-shaped PTC resistor 3.

The plate-shaped PTC resistors 3 are electrically contacted by the contact elements 4 on opposite narrow sides 33, 34. Thus heating current flows through the PTC resistors 3 within the plane defined by the plate-shaped PTC resistor 3 across the width of the PTC resistor 3. In contrast to conventional designs wherein heating current flows from a front side to a back side of a plate-shaped PTC resistor in the thickness direction of the plate-shaped PTC resistor, the electrical resistance provided by the plate-shaped PTC resistor 3 contacted at opposite narrow sides is much larger. Heating currents are thereby advantageously reduced even if high voltages are applied to the contact elements 4.

The contact elements 4 are embedded in the frame 6, e.g., by insert molding. The contact elements 4 may be provided as strips of sheet metal such that each contact element 4 electrically contacts several plate-shaped PTC resistors 3 arranged in a row and held by the frame 6.

The PTC resistors 3 may be clamped between the contact elements 4. For example, the contact elements may be metal strips with bent off rim sections 41 that press resiliently against the narrow sides of the PTC resistors 3 and form contact tongues. Clamping forces may be reduced as necessary by cutting out parts of the bent rim section 41.

The narrow sides 33, 34 of the PTC resistors 3 contacted by the contact elements 4 may be covered by a metallic layer in order to improve the electrical contact between the contact elements 4 and the PTC resistors 3.

Heat generated by the PTC resistors 3 is transferred to a tube of a heating rod 1 via the front and back sides 31, 32 of the PTC resistors 3. The PTC resistors 3 can be electrically isolated from a surrounding tube by isolating layers covering the front and back sides 31, 32, e.g., layers of ceramic material like alumina. Flat tubes may be compressed to improve thermal contact after the frame 6 with PTC resistors 3, contact elements 4 and isolating layers are arranged therein. Compressing the flat tubes makes them flatter and causes pressure on the front and back sides 31, 32 of the PTC resistors 3.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SIGNS

1 heating rod
2 cooling fin
3 PTC resistor
4 contact element
6 frame
8 holder
9 holder
31 front side
32 back side
33 narrow side
34 narrow side
41 bent rim section

What is claimed is:

1. A heating device, comprising:
   a plate-shaped ceramic PTC resistor having a thickness, a front side, a back side and narrow sides, wherein the distance from the front side to the back side equals the thickness;
   a first contact element electrically contacting the PTC resistor on a first one of the narrow sides; and
   a second contact element contacting the PTC resistor on a second one of the narrow sides opposite the first narrow side.

2. The heating device according to claim 1, comprising an electrically isolating frame holding the PTC resistor and the contact elements.

3. The heating device according to claim 2, wherein the contact elements are embedded in the frame.

4. The heating device according to claim 3, wherein the contact elements are embedded in the frame by insert molding.

5. The heating device according to claim 1, wherein the PTC resistor comprises a plurality of plate-shaped ceramic PTC resistors arranged in a row and electrically contacted on opposite narrow sides thereof.

6. The heating device according to claim 1, comprising a tube in which the ceramic PTC resistor and the contact elements are arranged.

7. The heating device according to claim 1, wherein the electrical contact elements are formed of strips of sheet metal.

8. The heating device according to claim 7, wherein the contact elements comprise bent rim sections that electrically contact the PTC resistor.

9. The heating device according to claim 1, wherein the electrical contact elements press resiliently against the narrow sides of the PTC resistor.

10. The heating device according to claim 1, wherein the narrow sides of the PTC resistor are covered by a metallic layer.

11. Air heater comprising several rod-shaped heating devices according to claim 1, wherein the rod-shaped heating devices are arranged side by side and cooling fins are arranged between neighboring rod-shaped heating devices.

12. The heating device according to claim 1, wherein the heating current is configured to flow across the width of the PTC resistor.

* * * * *